United States Patent [19]

Hennessy et al.

[11] 4,390,968
[45] Jun. 28, 1983

[54] AUTOMATED BANK TRANSACTION SECURITY SYSTEM

[75] Inventors: Richard E. Hennessy, Marlboro; Roger Frymire, Cambridge; Cary Coovert, Natick, all of Mass.

[73] Assignee: Honeywell Information Systems Inc., Waltham, Mass.

[21] Appl. No.: 221,674

[22] Filed: Dec. 30, 1980

[51] Int. Cl.³ .............................................. G06F 15/30
[52] U.S. Cl. .................................. 364/900; 364/408; 235/379
[58] Field of Search ...................... 364/408, 900, 200; 235/379

[56] References Cited

U.S. PATENT DOCUMENTS

| 4,025,760 | 5/1977 | Trenkamp | 364/408 X |
| 4,025,905 | 5/1977 | Gorgens | 364/900 |
| 4,075,460 | 2/1978 | Gorgens | 364/465 X |
| 4,234,932 | 11/1980 | Gorgens | 364/900 |
| 4,315,101 | 2/1982 | Atalla | 235/379 X |
| 4,321,672 | 3/1982 | Braun et al. | 364/408 |

*Primary Examiner*—David H. Malzahn
*Attorney, Agent, or Firm*—Nicholas Prasinos; George Grayson; Harry M. Weiss

[57] ABSTRACT

A banking system is disclosed which comprises a central computer system in electrical communication with remote automated teller machines, wherein the architecture of the banking system is such that the likelihood of a security penetration is substantially decreased whether the automated teller machine operates in an on-line or in an off-line mode.

5 Claims, 4 Drawing Figures

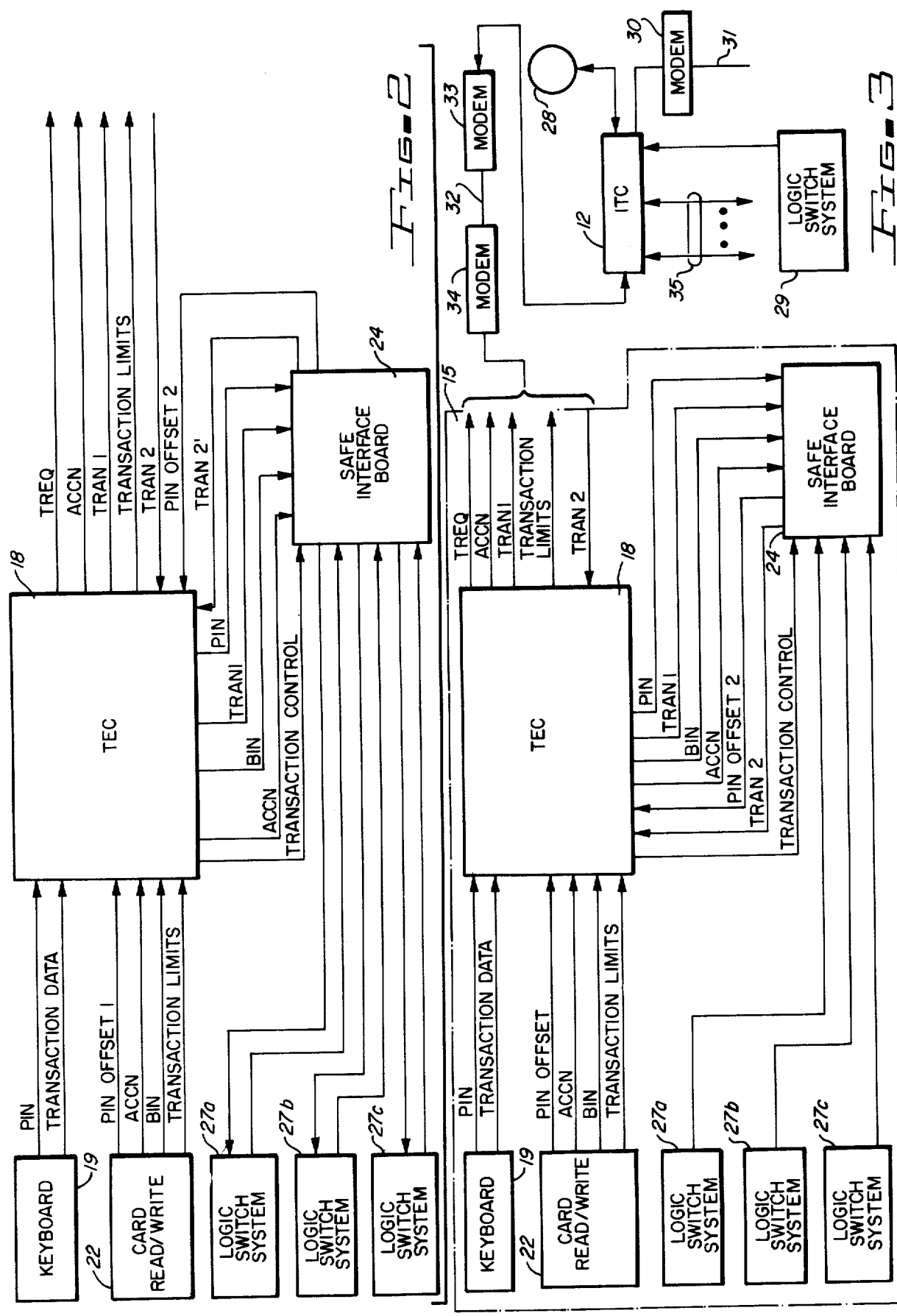

AUTOMATED BANK TRANSACTION SECURITY SYSTEM

FIELD OF THE INVENTION

The invention relates to automated banking systems, and more particularly to security systems used in combination with cash or negotiable instrument dispensers at locations remote from a central computer-controlled banking facility.

PRIOR ART

With the advent of computer-controlled banking facilities wherein a number of remote automated teller stations are in communication with and controlled by a centrally located computer, certain transaction security problems have become apparent. More particularly, telephone line monitoring devices and computer related equipment have been developed and used by computer thieves to secure funds from the bank systems. Fraudulently injected enabling signals, and the simulation of valid transaction messages from points along the communication path between the central computer and a remote terminal have been used successfully.

In response to this problem, prior art systems have remote terminals wherein a customer enters a personal identification number (PIN), which is transferred to the central computer for recognition. The central computer in turn authorizes a transaction to take place. The PIN number may be memorized by the user and may take the form of his social security number, his birth date or some other personal data known only to the customer and the bank. The PIN number may be further used in conjunction with a magnetically encoded card which includes data representative of a customer account number, bank identification number, and zone number. In some cases the card includes an encrypted identification number which relates the PIN number to a customer information file (CIF) signal stored at the central computer. The encrypted identification number is often referred to as the PIN OFFSET.

In the operation of such prior art systems, the customer typically enters his PIN number by way of a keyboard, and passes his magnetic card through registration with a card reader at the remote terminal. PIN and PIN OFFSET signals thereby are transferred to the central computer through telephone lines. At the central computer, the signals are compared with a customer CIF number which is used to identify the customer account and verify the identity of the customer. The central computer thereafter transmits a transaction authorization signal over the telephone line to the cash dispenser at the remote terminal.

Because of the relative ease by which any signal on a telephone line may be intercepted and simulated, practical systems in the prior art are generally provided with complex data encrypting devices whenever any signal such as the PIN, PIN OFFSET or transaction authorization signal is transmitted over a telephone line. Even though the resultant encrypted signals may be subject to interception, a suitably complex encryption algorithm may reduce the probability of a decoding by a thief. In the case of an authorization signal which is transmitted over the line, however, the mere duplication of the signal even if in encrypted form usually is sufficient to activate the cash dispenser at the remote terminals.

U.S. Pat. No. 4,075,460 assigned to the assignee of the present invention provides an improved remote terminal cash dispensing system. The security system is comprised of a PIN signal generator and a security device responsive to both the signal generator and an authorization signal comprised of the customer's CIF number which is supplied by a central computer. The signal path between the signal generator and the security device is wholly contained within the remote terminal. The PIN signal thus cannot be intercepted, and the mere simulation of the authorization signal alone will not penetrate the security of the remote terminal. Although the likelihood of a withdrawal by an unauthorized user is substantially reduced, an unauthorized use still may occur if a customer is careless with his PIN number. The PIN number may be entered at the remote terminal by the unauthorized party, and the authorization signal from the central computer may be simulated to cause the security device to command a cash release. The security system of the embodiment illustrated in FIG. 2 of the patent is more difficult to penetrate since a PIN OFFSET signal wholly internal to the remote terminal also is applied to the security device by way of a card reader for a comparison. Although the addition of the PIN OFFSET increases the necessity for obtaining both the customer PIN number and his encoded card, a theft still may occur through the use of knowledge gained from the card and intercepted signals. For example, once the relationship between a PIN OFFSET and a customer's CIF number is discovered, the customer's PIN may be determined. A customer's CIF number is transferred over telephone lines from the central computer to the remote transaction terminal. The determination of a PIN number is further facilitated from a knowledge of the number of bits comprising the PIN number. Such a BIT signal is supplied by the remote transaction terminal to the central computer. In each case, a cash theft may occur repeatedly once the control information peculiar to the customer is determined.

The invention disclosed herein is directed to a banking system for remote automated teller machines wherein no signals from which either a PIN or a PIN OFFSET may be derived are transferred over transmission lines available to an unauthorized user. The likelihood of a security penetration without knowledge of the customer's PIN number and possession of the customer's encoded card thereby is significantly reduced. The system further is made less susceptible to the repeated unauthorized use of simulated authorization or other control signals through the use of switch assembly multiplexing systems from which plural binary codes are dynamically selectable as parameters to be used in the encryption of the signals.

SUMMARY OF THE INVENTION

A banking system including a local central computer and a remote automated teller machine in an on-line and off-line operating environment is provided with security measures substantially decreasing the likelihood of a security penetration without knowledge of a customer's confidential personal identification number (PIN) and possession of a customer's banking card.

More particularly, a teller expansion controller (TEC) receives customer specific data including a PIN, a PIN OFFSET 1 number which is representative of a predetermined relationship with a customer's PIN, an account number (ACCN), a bank identification number (BIN) and transaction limitation data encoded on a customer card from customer initiated input/output units. Upon receipt of the information, the TEC performs an account number validation. If the account number is valid, the TEC forwards a transaction request (TREQ), the ACCN, a transaction number (TRAN 1) and transaction limitation data to an intelligent transaction controller (ITC) which may be located at the automated teller machine site or at the site of the central computer. The ITC in turn forwards the information to the central computer which compares the transaction request against customer account information. If the customer account balance and other transaction limits are not exceeded, the central computer issues an authorization signal to the ITC which responds by generating a second transaction number (TRAN 2) as a function of TRAN 1 and first logic switch system settings. Upon receipt of TRAN 2 from ITC, the TEC forwards the PIN, TRAN 1, BIN and ACCN information to a safe interface board (SIB). The SIB responds by generating a third transaction number (TRAN 2') which is a function of TRAN 1 and second logic switch system settings, and by generating a PIN OFFSET 2 signal which is a function of PIN, BIN, ACCN and third logic switch system settings. Upon receipt of TRAN 2' and PIN OFFSET 2 from the SIB, the TEC performs comparison tests between TRAN 2 and TRAN 2', and between PIN OFFSET 1 and PIN OFFSET 2. If each comparison results in an equivalency, the TEC issues transaction control commands to the SIB to cause cash to be issued to the customer or cash to be received from the customer.

In one aspect of the invention, in an on-line operation, no information from which a customer's PIN number may be discerned is transmitted over communication paths accessible by customers or unauthorized users.

In another aspect of the invention, in the event an authorization signal is issued by the central computer or the ITC over a transmission line to the remote automated teller machine during an on-line operation, the authorization signal is encrypted as a function of logic switch settings accessible only by bank officials. Such logic switch settings may be changed periodically to prevent repeated simulation of intercepted authorization signals by unauthorized users. In addition, the repeated use of customer cards by unauthorized users may be controlled by changing the logic switch setting parameters of the PIN OFFSET codes. The simulation of an authorization signal or the theft of a customer card alone, however, is not sufficient to penetrate the security of the banking system. Both knowledge of the customer's confidential PIN number and possession of a customer card is required.

In still another aspect of the invention, all signal paths between the TEC and the SIB, and between the SIB and a cash dispenser, a cash depository, and logic switch systems providing parameters upon which the SIB operates, are wholly contained within the automatic teller machine, and are inaccessible to customers and unauthorized users.

DESCRIPTION OF THE DRAWINGS

For a more complete understanding of the present invention and for further objects and advantages thereof, reference may now be had to the following description taken in conjunction with the accompanying drawings in which:

FIG. 2 is a functional block diagram of the automated teller machine of FIG. 1; and FIGS. 3 and 4 collectively provide a functional block diagram of an alternate embodiment of the invention for both the off-line and on-line operation of a remote automated teller machine.

DESCRIPTION OF PREFERRED EMBODIMENTS

FIG. 1

Figure 1:
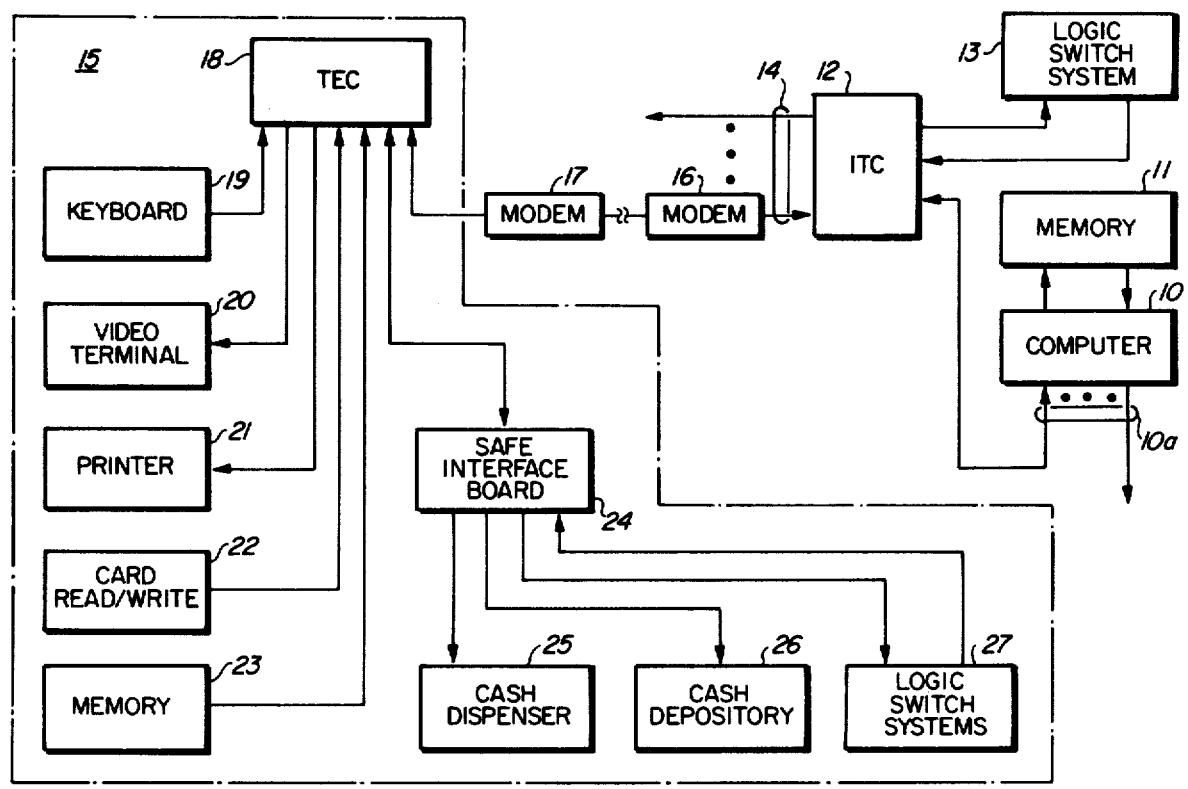
FIG. 1 is a functional block diagram of a banking system embodying the invention.

FIG. 1 illustrates in functional block diagram form a computer controlled banking system embodying the invention.

A central computer 10 with main memory 11 is in electrical communication with an intelligent transaction controller (ITC) 12. The ITC 12 and the central computer 10 are located at a central site. It is to be understood that the ITC 12 may in the alternative be located at a remote site and that the computer 10 may communicate with a plurality of ITCs by way of communication cables 10a. Each ITC in turn may communicate with a plurality of automated teller machines by way of communication paths such as telephone transmission lines 14.

Continuing with the description of FIG. 1, the ITC 12 is in electrical communication with logic switch system 13, and with a remote automated teller machine 15 by way of the telephone transmission lines 14. Each transmission line includes modem devices such as modems 16 and 17 respectively at the local and remote electrical interfaces.

In the preferred embodiment disclosed herein, the ITC 12 may be of the type manufactured and sold by Honeywell Information Systems Inc. at Wellesley Hills, Mass., and represented to the public as a model 7430 intelligent transaction controller.

The automated teller machine 15 is comprised of a teller expansion controller (TEC) 18, which in turn is in electrical communication with a keyboard 19, a video terminal 20, a printer 21, a card read/write unit 22, a remote memory unit 23, and a safe interface board (SIB) 24. The SIB 24 is in electrical communication with a cash dispenser 25, a cash depository 26, and logic switch systems 27.

The TEC 18 may be of the type manufactured and sold by Honeywell Information Systems Inc. as a component part of its Model 7712 financial transaction facility. A more complete description of the TEC 18 is provided in U.S. application Ser. No. 108,074 titled "Data Processing System With Self Testing and Configuration Mapping Capability," assigned to the assignee of the present invention, and incorporated herein by reference.

The keyboard 19 and card read/write unit 22 enter information into the TEC 18 in response to customer-initiated operations. The keyboard 19 comprises a conventional transaction data generator for converting customer-activated key operations to data representative of a desired banking transaction. The card read/write unit 22 may be any of many well-known magnetic read/write devices for reading and writing data encoded on magnetic stripes in accordance with ABA, IATA, MINTS or Thrift Standard Track formats. The unit 22 further may include other types of read/write devices including card perforation, optical character recognition (OCR), and magnetic ink character recognition (MICR) devices. The card unit 22 also may be a device for communicating with semiconductor microprocessor systems fabricated on a customer card. It is to be understood, however, that any suitable data entry means may be employed.

The data field imprinted upon a customer card or stored in a memory chip fabricated on the card may include encoded data words representative of a customer's account number (ACCN), bank identification number (BIN), a PIN OFFSET, and transaction limitation data which may be converted by the unit 22 to electrical signals which are provided to the TEC 18. The PIN OFFSET data word is representative of a predetermined relationship between a customer's (PIN) and customer-related information stored in the memory 11 of the central computer 10. The PIN number for a customer may be representative of the customer's birthdate, social security number or other personal data easily memorized. The BIN is a number that is unique to the remote station of the banking institution.

The SIB 24 is comprised of a microprocessor in electrical communication with a plurality of input/output (I/O) controllers for controlling data transfers between the SIB 24 and the TEC 18, the cash dispenser 25, the cash depository 26, and the logic switch systems 27. The cash dispenser 25 includes a means for storing a plurality of cash units, such as bills, and for delivering one or more of the stored cash units to a customer in response to control signals received from the SIB. The cash depository 26 includes means for receiving cash units from a customer and for storing such cash units for later access by backing personnel.

The logic switch systems 13 and 27 provide a means by which authorized banking personnel may dynamically select any one of plural parameters which may be used by the ITC 12 and the SIB 24 in validating transaction requests. In addition, the parameters which are selectable may be changed periodically by the bank officials. The logic switch systems are more particularly described in a copending application by Richard G. Harris entitled "Switch Multiplexing Apparatus For Switch Assemblies Having Plural Switch Arrays" having Ser. No. 221,675, filed on Dec. 30, 1980, assigned to the assignee of the present invention, and incorporated by reference herein.

In operation, a customer inserts a bank or credit card into the card read/write unit 22. ACCN, BIN, a first PIN OFFSET referred to as PIN OFFSET 1, and transaction limitation data is read from the card and transferred to the TEC 18. The transaction limitation data may include transaction amount, time and other transaction limits. In response to the information read from the customer card, the TEC 18 uses customer information stored in the memory unit 23 to verify the customer's account number as represented by the ACCN. If the account number is invalid, the TEC issues a transaction cancellation message on the video terminal 20 to the customer. If the account number is valid, however, the TEC issues a message on the video terminal 20 to instruct the customer to enter a PIN number and transaction data on the keyboard 19. At the conclusion of the keyboard entries, the TEC logically generates a transaction request (TREQ), and a transaction number (TRAN 1). The TEC thereafter forwards the TREQ, ACCN, TRAN 1 and transaction limitation data to the central computer 10 by way of the ITC 12. The central computer uses the ACCN number and transaction limitation data in comparing customer's account balance against the transaction request.

If the customer's account balance or other transaction limitation data is exceeded, the central computer issues a transaction cancellation message by way of the ITC 12 to the TEC 18. In any event, if a predetermined time period elapses during which no messages are received from the ITC 12, the TEC 18 issues a transaction cancellation message on the video terminal 20 to the customer. If the transaction request does not equal or exceed the account balance or other transaction limitations, however, the central computer issues an authorization signal to the ITC 12. The ITC 12 in response thereto generates a second transaction number (TRAN 2) which is a function of TRAN 1 and logic switch system 13 settings known only to bank officials.

Upon receipt of the TRAN 2 signal from the ITC 12, the TEC 18 forwards the ACCN, PIN, BIN, and TRAN 1 signals to the SIB 24. In response to the information received from the TEC 18, the SIB 24 generates a third transaction number referred to as TRAN 2'. TRAN 2' is a function of TRAN 1, and the switch settings of logic switch system 27 which are known only to bank officials. The SIB 24 further generates a second PIN OFFSET signal referred to as PIN OFFSET 2 which is a function of PIN, ACCN, and BIN, and forwards both TRAN 2' and PIN OFFSET 2 to TEC 18.

The TEC 18 compares TRAN 2 with TRAN 2'. If an equivalence occurs, the TEC 18 compares PIN OFFSET 1 with PIN OFFSET 2. If the PIN OFFSET signals are equivalent, the TEC 18 issues transaction control signals to the SIB 24 to deposit cash received from the customer or to dispense cash units to the customer. If either of the comparative tests fails, however, the TEC 18 issues a transaction cancellation message to the video terminal 20 for display to the customer.

Security of the banking system of FIG. 1 is achieved by containing all signal paths between computer 10, memory 11, ITC 12 and logic switch system 13 wholly within the central bank station and accessible only to authorized bank personnel. In addition, all signal paths between TEC 18, SIB 24, cash dispenser 25, cash depository 26 and logic switch systems 27 are wholly contained within the remote automated teller machine, and are accessible only to authorized bank personnel.

From the above, it is apparent that any attempt to intercept and simulate the TRAN 2 signal issued by the ITC 12 to the TEC 18 shall not be sufficient to penetrate the banking system security without knowledge of the customer's PIN number and possession of the customer's banking card. Further, any attempt to simulate a TRAN 2 signal repeatedly is thwarted by the periodic change of the settings of switch systems 13 and 27 by bank officials. Still further, customer specific information such as PIN and PIN OFFSET 1 are wholly contained within the automated teller machine 15, and are not transmitted over transmission lines susceptible to interception and capture by unauthorized users. In addition, the customer's PIN is not encoded on a customer card which may be lost, but rather remains wholly in the control of the customer. Lastly, the logic switch system 27 settings may be changed periodically to alter the PIN OFFSET code on customer cards, thereby preventing repeated use of stolen or counterfeit customer cards.

FIG. 2

FIG. 2 illustrates in functional block diagram form those devices comprising the automated teller machine 15 of FIG. 1 which contribute to the security of banking transactions while the central computer 10 is on-line, i.e. in communication with the automated teller machine 15.

As before described, a customer desiring to transact business with a banking institution may insert a customer card into the card read/write unit 22. PIN OFFSET 1, ACCN, BIN, and transaction limitation data is read from the card, and transferred to the TEC 18. In response to the information read from the customer card, the TEC 18 first verifies the customer account number, ACCN. If the account number is valid, the TEC 18 issues a message on the video terminal 20 to instruct the customer to enter a PIN number and transaction data on the keyboard 19. The TEC 18 thereafter logically generates TREQ and TRAN 1 in response to the customer's keyboard entries, and forwards TREQ, ACCN, TRAN 1 and transaction limitation data to the central computer 10 by way of the ITC 12. The central computer 10 uses the ACCN and transaction limitation data to compare the customer's account balance against the transaction request. If the transaction request does not exceed the account balance or other transaction limits the central computer 10 issues an authorization signal to ITC 12. The ITC 12 thereupon generates TRAN 2 which is a function of TRAN 1 and switch system 13 settings.

The TEC 18 waits a predetermined time period to receive either a TRAN 2 signal on a transaction cancellation message from the ITC 12. If a signal is not received within the time period, the TEC 18 terminates the transaction. If the TRAN 2 signal is received from the ITC 12 within the predetermined time period, however, the TEC 18 forwards ACCN, BIN, TRAN 1 and PIN to the SIB 24. In response to the information received from the TEC 18, the SIB 24 generates TRAN 2' as a function of TRAN 1 and the switch settings of logic switch system 27a. The SIB 24 further generates PIN OFFSET 2 as a function of PIN, ACCN, and BIN. In the alternative, either one of the independent variables comprising PIN OFFSET 2 may be superseded by a switch setting in logic switch system 27b, or the switch setting may be added as an additional independent variable to place further control in the banking institution and increase the flexibility of the system. Any such change in the encoding of PIN OFFSET 2, however, must be mirrored in PIN OFFSET 1 by a rewriting of such codes on customer cards. Such a flexibility provides protection against the counterfeiting or theft of customer cards without requiring hardware or software changes in the automated teller machine.

The SIB 24 forwards the TRAN 2' and PIN OFFSET 2 signals to the TEC 18 which compares TRAN 2 with TRAN 2' as before described. If an equivalency occurs, the TEC 18 compares PIN OFFSET 1 with PIN OFFSET 2. Upon the occurrence of an equivalence, the TEC 18 issues transaction control commands to the SIB 24 to deposit cash received from the customer or to dispense cash units to the customer. In the event that cash is to be dispensed to the customer, the logic switch system 27c may be used to limit the number of cash units which may be dispensed to a customer in response to any single request.

The logic switch systems 27a-27c which comprise the logic switch systems 27 of FIG. 1 provide a further security measure in that each of the switch systems 27a-27c are wholly contained within the remote terminal and inaccessible to customers and unauthorized users. The switch systems 27 may be comprised of a plurality of switch arrays, each array addressable by a binary code. The parameters used by the ITC 12 and SIB 24 as represented by the logic switch systems 27, therefore, may be changed by merely changing the address code applied to the switch systems 27. By periodically addressing different switch arrays in the switch systems 27, and by periodically changing the switch settings, the repeated use of simulated signals and stolen or counterfeit customer cards may be prevented.

Figure 4:
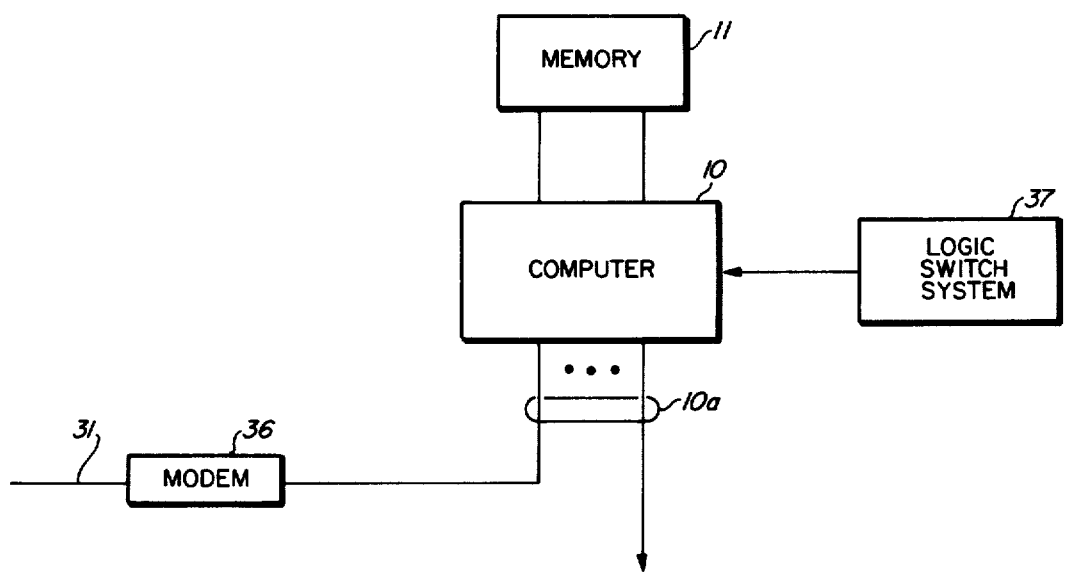

FIGS. 3 and 4

FIGS. 3 and 4 illustrate in block diagram form an alternative embodiment of the banking system of FIG. 1 for on-line operations, and for off-line operations where no communication with a central computer occurs.

Referring to FIG. 3, the ITC 12 may be located at a site remote to both the central computer 10 and the automated teller machine 15. The ITC 12 is in electrical communication with a disc unit 28, a logic switch system 29, and the central computer 10 by way of a modem 10 and a transmission line 31. The ITC 12 further is in electrical communication with the automated teller machine 15 by way of a transmission line 32 having modems 33 and 34. It is to be understood that the ITC 12 may be in communication with a plurality of other remote automated teller machines by way of communication lines 35.

During off-line operations, the ITC 12 assumes the functions normally performed by the central computer during on-line operations. More particularly, the ITC 12 receives TREQ, ACCN, TRAN 1 and transaction limitation data from the TEC 18 as before described. The ITC 12 uses the ACCN number to access customer account information stored on the disc unit 28. The transaction request as represented by TREQ then is compared against the account balance and the transaction limits. If the transaction request does not equal or exceed the account balance, or exceed transaction limits, the ITC 12 updates the account information on disc 28, and generates TRAN 2 as a function of TRAN 1 and the settings of logic switch system 29 known only to bank officials. The logic switch system 29 is of the type previously described as logic switch systems 13, and 27a-27c. The operation of the automated teller machine 15 procedes as before described in connection with the description of FIG. 2.

When the automated teller machine enters an on-line operation mode, the ITC 12 transfers account and transaction information stored on disc 28 to the central computer 10 by way of a modem 30 and transmission line 31. The ITC 12 further forwards TREQ, ACCN, TRAN 1 and transaction limitation data received from TEC 18 to the central computer 10 of FIG. 1 by way of transmission line 31 for a transaction validation. In such an on-line operation, the central computer 10 uses the ACCN number to access the customer account stored in memory unit 11, and compares the transaction request against the account balance and limitation data. If the transaction request does not equal or exceed the account balance or other transaction limits, the central computer 10 shall issue an authorization signal to transmission line 31.

Referring to FIG. 4, the computer 10 is in electrical communication with transmission line 31 by way of a modem 36 and one of the communication cables 10a. When an authorization signal is issued to the ITC 12 by way of transmission line 31, the signal may be intercepted and later simulated by an unauthorized user. In the preferred embodiment disclosed herein, however, the authorization signal is a function of TRAN 1 and a logic code supplied to the computer 10 by a logic switch system 37. The logic switch system 37 is of the same type as the logic switch system 29 of FIG. 3, and is under the sole control of bank officials. By periodically changing the switch settings of the logic switch system 37, the repeated use of an authorization signal by an unauthorized user monitoring the transmission line 31 may be prevented. As before stated, the mere simulation of an authorization signal alone does not penetrate the security of the banking system.

It is to be understood that the switch settings of the logic switch system 37 must be duplicated in the logic switch system 29 of FIG. 3 for the ITC 12 to recognize an authorization signal. Upon receiving an authorization signal from the computer 10, the ITC 12 generates TRAN 2 as a function of TRAN 1 and the settings of logic switch system 29. The operation of the automated teller machine 15 then continues as before described in connection with the description of FIG. 2.

The invention may be embodied in other specific forms without departing from the spirit or essential characteristics thereof. The present embodiments are therefore to be considered in all respects as illustrative and not restrictive, with the scope of the invention being indicated by the appended claims rather than by the foregoing description. All changes which come within the meaning and range of equivalency of the claims are therefore intended to be embraced therein.

What is claimed is:

1. An automated banking system, including a central computer system located at a central site, which comprises:
  (a) plural data entry means located at a like plurality of remote sites and responsive to customer initiated action for providing binary information signals representative of a personal identification number (PIN), an account number (ACCN), a bank identification number (BIN), a number having a predetermined relationship with said PIN (PIN OFFSET 1), transaction data descriptive of a desired banking transaction, and transaction limits;
  (b) plural automated teller machines each located at any one of said remote sites and receiving said PIN, ACCN, BIN, PIN OFFSET 1, transaction data and transaction limits from an adjacent one of said plural data entry means for performing the following operations by way of signal paths wholly contained within said plural automated teller machines:
    (1) validating said ACCN against resident binary customer account number codes,
    (2) generating a first transaction identification number (TRAN 1), a transaction request (TREQ), a second transaction identification number as a function of TRAN 1 (TRAN 2'), and a number which is a function of PIN, BIN and ACCN (PIN OFFSET 2),
    (3) comparing TRAN 2' and a third transaction number which is a function of TRAN 1 (TRAN 2),
    (4) if TRAN 2 and TRAN 2' are equivalent, comparing PIN OFFSET 1 and PIN OFFSET 2, and
    (5) if PIN OFFSET 1 and PIN OFFSET 2 are equivalent, dispensing transaction items to said customer and receiving transaction items from said customer in accordance with said transaction data; and
  (c) plural controller means in electrical communication with said central computer system during on-line operations and in electrical communication with different pluralities of said plural automated teller machines during both on-line and off-line operations, and receiving TREQ, ACCN, TRAN 1 and said transaction limits from said plural automated teller machines for transfer to said central computer system during on-line operations, and for validating TREQ against said transaction limits and resident customer account information during off-line operations, and for generating TRAN 2 for transfer to a requesting one of said plural automated teller machines in the event TREQ is valid.

2. An automated banking system including a central computer system located at a central site which comprises:
  (a) data entry means located at a remote site and responsive to customer initiated action for providing binary information signals representative of a personal identification number (PIN), an account number (ACCN), a bank identification number (BIN), a number having a predetermined relationship with said PIN (PIN OFFSET 1), transaction data descriptive of the banking transaction desired, and transaction limits;
  (b) first controller means located at said remote site and receiving said PIN, ACCN, BIN, PIN OFFSET 1, transaction data and transaction limits from said data entry means for performing the following operations:
    (1) validating said ACCN against binary customer account number codes resident in said first controller means,
    (2) generating a first transaction identification number (TRAN 1), and a transaction request (TREQ),
    (3) comparing a second transaction number which is a function of TRAN 1 (TRAN 2) and a third transaction number which is a function of TRAN 1 (TRAN 2'),
    (4) if TRAN 2 and TRAN 2' are equivalent, comparing PIN OFFSET 1 and a number which is a function of PIN, BIN and ACCN (PIN OFFSET 2), and
    (5) if PIN OFFSET 1 and PIN OFFSET 2 are equivalent, issuing transaction control signals for exchanging transaction items with a customer;
  (c) second controller means located at said remote site and receiving PIN, BIN, ACCN, and TRAN 1 from said first controller means, and generating therefrom PIN OFFSET 2 and TRAN 2' for transfer to said first controller means, and responsive to said transaction control signals for dispensing transaction items to said customer and receiving transaction items from said customer in accordance with said transaction data; and
  (d) third controller means located at said central site and receiving TREQ, ACCN, TRAN1 and transaction limits from said first controller means for transfer to said central computer system, and receiving an authorization signal from said central computer system in the event TREQ does not exceed either said transaction limits or an account balance of said customer for generating TRAN 2 for transfer to said first controller means.

3. An automated banking system as set forth in claim 2, further comprising:
   (a) first logic switch means located at said central site and in electrical communication with said third controller means for providing dynamically selectable parameters used in the generation of TRAN 2; and
   (b) second logic switch means located at said remote site and in electrical communication with said second controller means for providing dynamically selectable parameters used in the generation of TRAN 2' and PIN OFFSET 2, and in the setting of limits on the cash flow to customers.

4. An automated banking system including a central computer system located at a central site which comprises:
   (a) data entry means located at a first remote site and responsive to customer initiated action for providing binary information signals representative of a personal identification number (PIN), an account number (ACCN), a bank identification number (BIN), a number having a predetermined relationship with said PIN (PIN OFFSET 1), transaction data descriptive of the desired banking transaction, and transaction limits;
   (b) first controller means located at said first remote site and receiving said PIN, ACCN, BIN, PIN OFFSET 1, transaction data and transaction limits from said data entry means for performing the following operations:
      (1) validating said ACCN against binary customer account number codes resident in said first controller means,
      (2) generating a first transaction identification number (TRAN 1), and a transaction request (TREQ),
      (3) comparing a second transaction number which is a function of TRAN 1 (TRAN 2) and a third transaction number which is a function of TRAN 1 (TRAN 2'),
      (4) if TRAN 2 and TRAN 2' are equivalent, comparing PIN OFFSET 1 and a number which is a function of PIN, BIN and ACCN (PIN OFFSET 2), and
      (5) if PIN OFFSET 1 and PIN OFFSET 2 are equivalent, issuing transaction control signals for exchanging transaction items with a customer;
   (c) second controller means located at said first remote site and receiving PIN, BIN, ACCN, and TRAN 1 from said first controller means, and generating therefrom PIN OFFSET 2 and TRAN 2' for transfer to said first controller means, and responsive to said transaction control signals for dispensing transaction items to said customer and receiving transaction items from said customer in accordance with said transaction data; and
   (d) third controller means located at a second remote site and receiving TREQ, ACCN, TRAN 1 and said transaction limits from said first controller means for transfer to said central computer system, and receiving an authorization signal from said central computer system in the event TREQ does not exceed either said transaction limits or an account balance of said customer for generating TRAN 2 for transfer to said first controller means.

5. An automated banking system as set forth in claim 4, further comprising:
   (a) first logic switch means located at said central site and in electrical communication with said central computer for providing dynamically selectable parameters for use by said central computer in encrypting said authorization signal;
   (b) second logic switch means located at said second remote site and in electrical communication with said third controller means for providing dynamically selectable parameters used in the generation of TRAN 2;
   (c) memory means located at said second remote site and in electrical communication with said third controller means for recording bank transactions and providing customer account information during off-line operations in which said third controller means receives TREQ, ACCN, TRAN 1 and said transaction limits, provides said authorization signal and generates said TRAN 2; and
   (d) third logic switch means located at said first remote site and in electrical communication with said second controller means for providing dynamically selectable parameters used in the generation of TRAN 2' and PIN OFFSET 2, and in the setting of limits on the cash flow to customers.

* * * * *